United States Patent [19]

Swanson

[11] Patent Number: 4,705,254
[45] Date of Patent: Nov. 10, 1987

[54] ADJUSTABLE AND REMOVABLE VICE STAND ASSEMBLY FOR MOTOR VEHICLE

[76] Inventor: Mark G. Swanson, R.R. #1, Box 604, Idaho Springs, Colo. 80452

[21] Appl. No.: 742,945

[22] Filed: Jun. 10, 1985

[51] Int. Cl.$^4$ .................................................. A47G 29/00
[52] U.S. Cl. ...................................... 248/287; 248/298; 248/295.1; 248/124
[58] Field of Search ...................... 248/287, 298, 295.1, 248/279, 297.2, 297.3, 309.1, 313, 352, 359 E, 124; 269/97, 98

[56] References Cited

U.S. PATENT DOCUMENTS

| | | | |
|---|---|---|---|
| 615,250 | 12/1898 | Clark | 248/287 |
| 1,756,629 | 4/1930 | Campbell | 248/287 |
| 2,715,777 | 8/1955 | Taylor | 248/298 |
| 3,227,414 | 1/1966 | Dean | 248/287 |
| 3,754,664 | 8/1973 | Kotkins | 248/298 |
| 3,785,541 | 1/1974 | Sibley | 248/298 |
| 4,557,453 | 12/1985 | McCloskey | 248/287 |

FOREIGN PATENT DOCUMENTS 531992  8/1955  Italy .................................... 248/287

Primary Examiner—Reinaldo P. Machado
Assistant Examiner—Alvin Chin-Shue
Attorney, Agent, or Firm—William P. O'Meara

[57] ABSTRACT

An adjustable and removable vice assembly for use on a vehicle comprising an elongated receiving member fixedly mountable on a rear end portion of a vehicle in generally parallel alignment with a longitudinal axis of the vehicle; an elongated support member receivable in the receiving member in rearwardly extending relationship therewith; and longitudinally slidably adjustable with respect thereto; a slide member which is vertically slidingly adjustable with respect to the elongated support member; a vice mounted on the slide member; and stabilizing and holding devices associated with the receiving member, the support member and the slide member for selectively stably holding the members in a selected fixed relationship.

20 Claims, 5 Drawing Figures

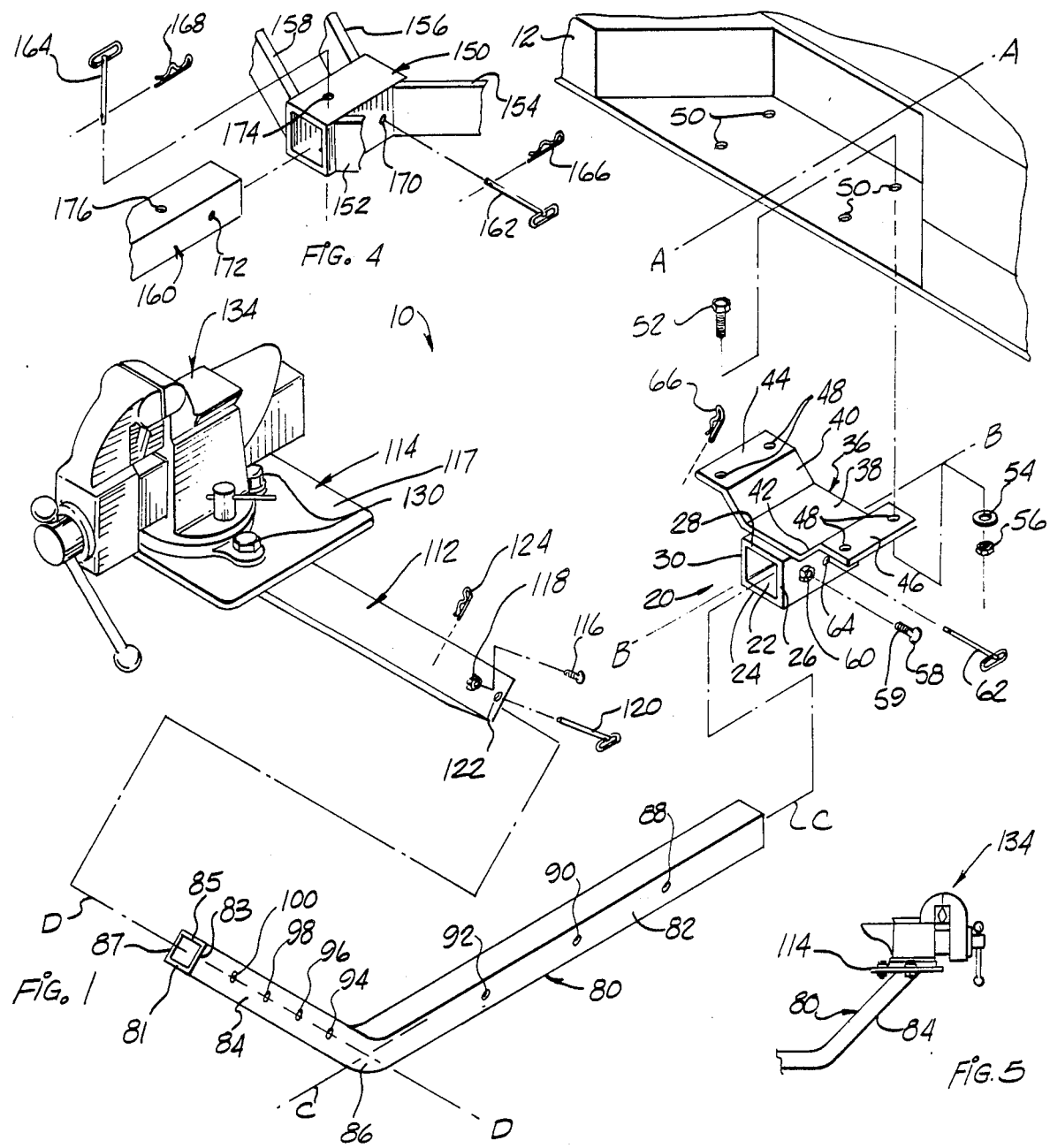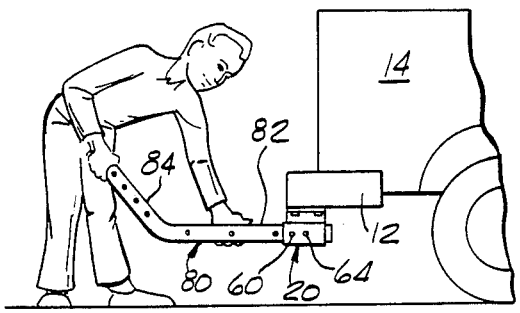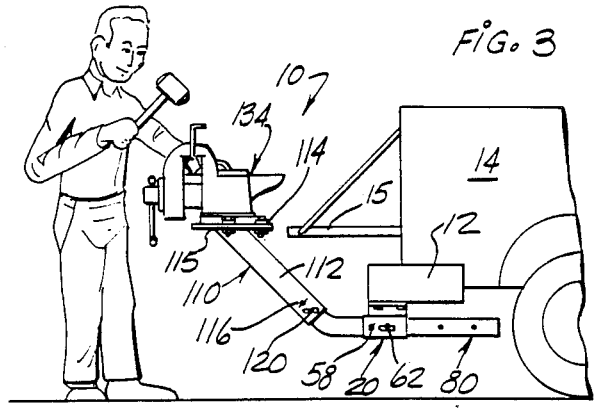

ated vice stand assembly comprising:

ADJUSTABLE AND REMOVABLE VICE STAND ASSEMBLY FOR MOTOR VEHICLE

BACKGROUND OF THE INVENTION

The present invention relates generally to work stands and, more particularly, to a vice stand assembly which is adjustably and removably mountable on the rear end portion of a motor vehicle such as a pickup truck.

During construction and maintenance operations, it is often necessary for a worker to securely hold a work piece in a fixed position in order to perform a particular work activity, e.g. soldering, welding, drilling, bending, etc. A table mounted vice is usually provided for this purpose when the work is performed in an indoor maintenance area. However, in many new construction and field maintenance operations, no such fixtures are provided, thus requiring a worker to provide his own portable-type vice assembly. Although it is possible to simply construct a work bench and mount a table vice on it at the work site, such an operation is very time consuming and requires the use of construction materials which may or may not be present at a work site. In addition, the work site may consist only of uneven or muddy ground which may not be suited for supporting a conventional table and vice. In order to overcome such problems, vices are sometimes mounted on the side wall of a pickup bed through the use of a strap assembly. A problem with such a mounting configuration is that the strap assembly must have laterally outwardly projecting bracket portions for supporting the vice. Such outwardly extending bracket portions may form a hazard when the vice is not in use unless the bracket is removed. On the other hand, if the bracket assemblies or the mounting straps are removed after each use of the device, the vice mounting procedure is extremely time consuming. The straps and brackets also tend to scratch or damage the side walls of the pickup. Another problem inherent with such a mounting assembly relates to its position with respect to the tailgate of the pickup. A tailgate when folded down into a horizontal position, is often used to provide a flat work surface on which various working operations may be performed and on which tools may be supported. When a vice is mounted on the side wall of the truck a worker using the vice is often required to move back and forth from the side of the truck to the rear of the truck as he works. It would be generally desirable to provide a vice assembly for motor vehicles which overcomes these problems.

OBJECTS OF THE INVENTION

It is an object of the present invention to provide a vice stand assembly which enables a vice to be stably supported on a motor vehicle such as a pickup truck.

It is another object of the present invention to provide a vice stand assembly which enables a vice to be positioned at the rear end of a pickup truck proximate a tailgate assembly.

It is another object of the present invention to provide an adjustable vice stand assembly which may be adjusted both vertically and longitudinally with respect to a motor vehicle to which it is attached.

It is another object of the present invention to provide a vice stand assembly which is relatively lightweight and compact.

It is another object of the present invention to provide a vice stand assembly which may be mounted on a conventional rear end mounted equalizer-type hitch assembly.

It is another object of the present invention to provide a vice stand assembly which may be mounted on a receptacle attached to a vehicle rear bumper.

It is another object of the present invention to provide a vice stand assembly which may be mounted on a vehicle by a permanently attached receptacle which does not project outwardly from the rear end of the motor vehicle.

It is another object of the invention to provide a vice stand assembly which may be readily constructed from available materials such as square pipe and steel plate.

SUMMARY OF THE INVENTION

The present invention comprises a vice stand assembly which may be removably and adjustably mounted on the rear end portion of a vehicle such as a pickup truck to provide a stable clamping means for holding work pieces. The vice stand assembly may comprise a receiving member such as a bracket mounted, square tubing section attached to a rear bumper of the vehicle, or may alternately comprise a conventional equalizer having a square cross section opening. The vice stand assembly also comprises a support member means which is preferably a single length of square pipe having a bend of about forty-five degrees therein to provide a horizontal arm portion and an upwardly and rearwardly extending inclined arm portion. The horizontal arm portion may be slidingly received by the receiving member attached to the rear end portion of the vehicle and may be fixedly secured thereto at a plurality of different longitudinal positions. The inclined arm portion of the support member means is adapted to receive a sliding table stand. The table stand may comprise a tubular slide member which may be a square pipe having an inner dimension adapted to closely slidingly fit over the inclined arm portion of the support member. The tubular slide member may be fixedly secured at a number of different positions along the length of the support member inclined arm portion. A table plate may be mounted on the tubular slide member at an angle so as to provide a horizontal surface at the top of the tubular slide member adapted to support a vice or other clamping assembly. The construction and arrangement of the receiving member, support member and tubular slide member are preferably such that the relative position of the table member may be adjusted to place it at approximately waist level with respect to a worker using a vice mounted thereon. In a preferred embodiment in which the vice stand assembly is mounted at the rear end of a pickup truck, the vice stand assembly is preferably constructed and arranged such that the table portion thereof may be positioned in close longitudinal proximity to the tailgate portion of the pickup truck when the tailgate is folded down into a horizontal orientation. The means for securing the support member to the receiving member and for securing the slide member to the support member may be a thumb screw and pin assembly or, alternately, a double pin assembly received through holes in the various members and enabling the members to be quickly attached to or detached from one another and enabling a stable attachment between the various members.

BRIEF DESCRIPTION OF THE DRAWINGS

FIG. 1 is an exploded perspective view of the adjustable and removable vice stand assembly of the present invention.

FIG. 2 is a side elevation view illustrating the sliding mounting of a support member within a receiving member attached to the rear end of a motor vehicle.

FIG. 3 is a side elevation view illustrating the use of the adjustable and removable vice stand assembly at the rear end of the motor vehicle.

FIG. 4 is a perspective view of an alternate receiving member configuration.

FIG. 5 is a side elevation view of an alternate support member configuration.

DETAILED DESCRIPTION OF THE INVENTION

The adjustable and removable vice stand assembly 10 of the present invention is adapted for mounting at a rear end portion of a motorized vehicle such as a pickup truck 14. The invention, in general, comprises a receiving means such as short length receiving member 20, which is fixedly mounted at a rear end portion of vehicle 14 with its central longitudinal axis BB in parallel alignment with a central longitudinal axis AA of the vehicle. The receiving means is preferably mounted at a position below the rear bumper 12 of the vehicle in a manner such that it does not substantially project beyond the rear surface of the bumper. A support member means may comprise a single length support member 80 constructed from square tubing. The member 80 may have a relief bend 86 at an intermediate portion thereof to provide a first arm portion 82 and a second arm portion 84. The cross sectional configuration of member 80 is such that the first arm portion 82 is closely slidingly receivable within the receiving member 20. The polygonal configuration of the receiving member and the support member member prevents twisting rotation of the support member about the longitudinal axis BB of the receiving member. Longitudinal positioning and adjusting means are provided such as pin hole 64 in the receiving means and a plurality of pin holes 88, 90, 92 in the first arm portion of the support member means, adapted to receive hitch pin 62 therethrough to hold the support member means in longitudinally fixed relationship with respect to the receiving means. Although the complimentary polygonal cross sections of the support member means and receiving means act to substantially restrain transverse displacement of the support member means within the receiving means, additional transverse tightening means such as thumb screw 58 may be provided to further reduce transverse displacement. A sliding means such as slide member 112, is constructed and arranged to closely slidingly receive the second arm portion 84 of the support member means. An attachment means for facilitating attachment of a clamping means such as vice 134 or the like to an upper portion of the sliding means may comprise a table plate 114 fixedly attached to the upper end of the tubular slide member 112 in a manner to provide a generally horizontal attachment surface 117, i.e. surface 117 is parallel to the axis AA of vehicle 14. Due to the upward and rearward inclination of the second arm portion 84 of the support member means, the elevation of the sliding means, and thus the attached clamping means, may be selectively adjusted by sliding movement of the slide member 112 along arm portion 84. A plurality of pin holes in arm portion 84 adapted to be aligned with pin hole 122 in slide member 112 enable the slide member to be held in a selected vertical position by hitch pin 120. A transverse tightening means such as thumb screw 116 may also be provided to take up any space between the support member and the slide member to stabilize the slide member transversely.

In operation, the receiving member 20, is permanently attached below the rear end of the vehicle preferably in rearwardly non-protruding relationship therewith. When it is desired to mount the vice stand assembly 10 on the vehicle, first the support member means, e.g. square pipe support member 80 is slidingly inserted into the receiving member 20. Next, slide member means, e.g. slide member 112 and table plate 114, preferably with a clamping means such as device 134 already attached thereto, are slidingly mounted on the inclined arm portion 84 of member 80. Thereafter, slide member 112 is secured to the support member 80 at the desired height as by pin 120 and thumb screw 116. Finally, slide member 80 is moved forwardly or rearwardly within receiving member 20 to a desired position such as, e.g. in close proximity to horizontally folded tailgate 15, where it is securely attached as by pin 62 and thumb screw 58. To disassemble the vice stand assembly, the above mounting steps may simply be reversed. In some situations, especially where space saving requirements in stowing the vice stand are not paramount, the slide member 112 may simply be left attached to the support member 80 thereby increasing the speed with which the vice stand assembly 10 may be mounted or removed from the vehicle. In another embodiment, as illustrated in FIG. 5, the slide member 112 is simply eliminated and the vice 134 is simply mounted at one end of support member 80.

Having thus described the invention in general, the various components of the invention will now be described in further detail.

As illustrated in FIG. 1, the receiving means of the adjustable and removable vice stand assembly 10 may comprise a relatively short length portion, e.g. five inches of polygonal cross section, preferably square cross section tubing which may be, e.g. two inch O.D., twelve gauge, steel tubing. The receiving member may thus comprise a square opening 22 provided by four walls 24, 26, 28, 30. The receiving means may also comprise a mounting bracket 36 having a body portion 38 fixedly attached as by welding to upper wall portion 28 of receiving pipe 20. Mounting bracket 36 may also comprise spacer wings 40, 42 extending upwardly and outwardly from the body portion and terminating in flanges 44, 46 provided with bolt holes 48 alignable with holes 50 in bumper 12 to enable the receiving means to be permanently mounted on the bumper as by bolt, nut and washer assemblies 52, 54, 56. A transverse tightening means for preventing transverse movement or rotation of the support member 80 within the receiving member 20 may comprise a conventional threaded thumb screw 58 adapted to be received within threaded nut 60 which is, in turn, aligned with a hole (not shown) in side wall 26 to which it is welded. In operation, the terminal end 59 of the thumb screw engages the outer surface of member 80. By tightening the thumb screw the member 80 may thus be urged laterally against the opposite side wall 30 of the receiving member to hold it in snug, frictionally engaging relationship therewith and preventing any transverse or rotational movement of the support member 80 within the receiving member 20.

A longitudinal positioning and adjustment means is also associated with the receiving means and may comprise a pair of oppositely positioned holes 64 (only one shown) in receiving member side walls 26, 30 which are alignable with a plurality of opposite paired holes 88, 90, 92 (only one of each set of paired holes shown) in the first leg portion 82 of support member 80 in side walls 83 and 87. Hitch pin 62 may thus be inserted through the aligned holes, as illustrated in FIG. 3, to hold the support member 80 in longitudinally fixed relationship with respect to the receiving member 20. A lock pin 66 may be associated with the hitch pin 62 to insure that it is retained in position.

As shown in FIG. 4, in an alternative embodiment the receiving means may comprise a receiving member 150 comprising a short length of square tubing which is attached to a rear portion of the vehicle frame by structural members 152, 154, 156, 158 welded to forward and rear portions thereof. In this configuration, transverse and rotational as well as longitudinal movement of a support member 160 is prevented by a pair of hitch pins 162, 164 with associated lock pins 166, 168 that are positioned through associated holes 170, 172, etc. and 174, 176, etc. in the receiving member and support member. Thus, hitch pin 162 prevents movement in a vertical direction as well as a longitudinal direction and hitch pin 164 prevents movement in a lateral direction as well as a longitudinal direction. The two pins 162, 164 also co-act to prevent rotational movement about the longitudinal axes of the members 150, 160.

As best illustrated in FIG. 1, the support member means preferably comprises a square tube support member 80 defined by four side walls 81, 83, 85, 87. The support member 80 preferably comprises a single length member having a relief bend 86 at an intermediate portion thereof to define a first horizontally extending arm portion 82 which may be, e.g. twenty-six inches long, and a rearwardly and upwardly inclined second arm portion 84 which may be, e.g. sixteen inches long. The relief bend may be, e.g. forty-five degrees, with a three inch inside radius. The support member 80 is adapted to be closely received within the receiving member 20 and slide member 112 and may be, e.g. 1.75 inch O.D., twelve gauge, steel square tubing. Although relatively few holes are shown in the illustration to avoid clutter, in a preferred embodiment the holes may be spaced approximately one to three inches apart and may be, e.g. 0.453 inch diameter holes. Holes 94, 96, 98, 100 in the second arm portion 84, may be of similar size and similarly spaced. In an alternate embodiment (not shown) separate pieces of pipe may be welded together to form the two arms of the support means.

In another configuration, as illustrated in FIG. 5, the support member 80 may have a plate 114 welded directly to the top thereof to enable attachment of a clamping means such as vice 134 directly thereto thereby eliminating the use of a sliding member 112. However, in this embodiment the relative vertical height of the vice 134 may not be adjusted.

As illustrated in FIG. 1, the slide means may comprise a slide member 112 constructed from square tubing which may be two inch O.D., twelve gauge, steel, square tubing. An upper end portion of tubular slide member 112 may be cut at a forty-five degree angle with respect to the longitudinal axis DD of the second arm portion 84 to enable welding attachment of table plate 114 thereto as at 115, FIG. 3, to provide the table plate with a generally horizontal orientation when the vice stand assembly is mounted on a vehicle. A threaded nut 118 may be fixedly associated with a hole in one side wall of the slide member 112 to enable threaded mounting of a thumb screw 116 in the same manner as described above with respect to the receiving member. Similarly, a pair of aligned holes 122 (only one shown) may be provided in two opposite side walls of the side member in a position to be alignable with holes 94, 96, 98, etc. in the support member second arm portion 84 thereby enabling the slide member to be located and held at various longitudinal orientations with respect to the central axis DD of second arm portion 84 by insertion of hitch pin 120 in selected aligned holes. Hitch pin 120 may be secured in position with lock pin 124. Various attachment means may be provided such as bolts 130 associated with bolt holes (not shown) in table plate 114 for securing vice means 134 in fixed relationship thereto. Although a steel anvil-type vice has been illustrated in the drawing, it will be understood that any type of clamping means such as those adapted for holding wooden boards, etc. might be substituted for the vice 134 depending upon the particular skill of the worker using the vice stand assembly.

It will be understood by those having skill in the art that various adapters may be used to attach different components of the invention as described herein, for example it would be possible to mount a square conduit of intermediate size between a support member and a receiving member in a situation where the receiving member comprises a considerably larger internal diameter than the outer diameter of the support member. Such adapters could be attached in numerous conventional ways such as by pinning, welding, etc.

It is contemplated that the inventive concepts herein described may be variously otherwise embodied and it is intended that the appended claims be construed to include alternative embodiments of the invention except insofar as limited by the prior art.

What is claimed is:

1. An adjustable and removable vice assembly for use on a pickup truck of the type having a cargo carrying box and a rearwardly opening, horizontally foldable tailgate assembly associated with the cargo carrying box comprising:

elongated receiving means fixedly mounted on a rear end portion of the pickup truck proximate and below the tailgate assembly in generally parallel alignment with a longitudinal axis of the pickup truck for slidingly receiving and holding an elongated support member means therein;

elongated support member means receivable in said receiving means in rearwardly extending relationship therewith for supporting a slide member means thereon said elongated support member means being longitudinally slidingly adjustable with respect to said elongated receiving means and having a first longitudinally extending portion and a second inclined portion extending upwardly from said first portion;

slide member means for supporting a vice means thereon, said slide member means being vertically slidingly adjustable on said elongated support member means and extending upwardly therefrom;

vice means for selectively gripping and holding a work piece mounted on said slide member means in fixed relationship therewith;

stabilizing and holding means operatively associated with said elongated receiving means, said elongated support means and said slide member means for selectively stably holding said receiving means, said support means and said slide member means in a plurality of selected fixed relationships;

said elongated support member means first longitudinally extending portion being of sufficient length whereby said slide member means is adjustably positionable rearwardly of the rearwardly opening tailgate when the tailgate is in a generally horizontal, outwardly folded position;

said elongated support member means second longitudinally extending portion being of a sufficient length whereby said slide member means is adjustably positionable thereon at the same elevation as the rearwardly opening tailgate when the tailgate is in a generally horizontal, outwardly folded position; whereby said slide member means is positionable next adjacent the tailgate when the tailgate is in a generally horizontal, outwardly folded position and whereby no portion of said removable vice assembly is positioned in obstructing relationship with a horizontal work surface provided by the tailgate when the tailgate is in said generally horizontal, outwardly folded position.

2. The invention of claim 1 wherein said elongated receiving means, said elongated support member means and said slide means each comprise square tubing.

3. The invention of claim 2 wherein said elongated support member means second portion extends upwardly and rearwardly from said first portion.

4. The invention of claim 3 wherein said first portion is oriented at approximately 45 degrees with respect to said second portion.

5. The invention of claim 2 wherein said first portion of said elongated support member means is received in close sliding relationship within said elongated receiving means and said second portion of said elongated support member is received in close sliding relationship within said slide member means.

6. The invention of claim 5 wherein said stabilizing and holding means comprise:
a plurality of holes in said first portion of said elongated support member means alignable with at least one hole in said elongated receiving means; and
pin means insertable through said alignable holes in said receiving means and said support member means for preventing relative longitudinal movement between said first portion of said support member means and said receiving means.

7. The invention of claim 6 wherein said stabilizing means comprises:
threaded screw receiving means fixedly associated with of said elongated receiving means extending transversely of said elongated receiving means; and
screw means threadingly receivable by said screw receiving means and abuttingly engageable with a sidewall portion of said first portion of said elongated support member means for urging said support member means into tight frictional engagement with said elongated receiving means for preventing relative transverse movement of said elongated support member means with respect to said elongated receiving member means.

8. The invention of claim 5 wherein said stabilizing and holding means comprise:
a plurality of vertically extending holes in said first portion of said elongated support means alignable with at least one vertically extending hole in said elongated receiving means;
first pin means insertable through said alignable vertically extending holes in said receiving means and said support member means for restraining lateral and longitudinal movement therebetween;
a plurality of horizontally extending holes in said first portion of said elongated support means alignable with at least one horizontally extending hole in said elongated receiving means; and
second pin means insertable through said alignable horizontally extending holes in said receiving means and said support member means for restraining vertical and longitudinal movement therebetween.

9. The invention of claim 1 wherein said stabilizing and holding means comprises:
means for restraining longitudinal displacement of said support member means with respect to said receiving means;
means for restraining transverse displacement and rotational displacement of said support member means with respect to said receiving means;
means for restraining longitudinal displacement of said slide member means with respect to said support member means; and
means for restraining transverse displacement and rotational displacement of said slide member means with respect to said support member means.

10. The invention of claim 1 wherein said slide means comprises a mounting plate fixedly mounted to an upper end thereof and constructed and arranged to provide a horizontal surface for mounting said vice means thereon.

11. A method of removably mounting a vice on a truck of the type having a cargo carrying box and a rearwardly opening tailgate assembly comprising the steps of:
attaching a receiving member having a longitudinally extending polygonal cross-sectional opening therein to a lower rear end portion of the vehicle below the elevation of the tailgate assembly and in longitudinal alignment with the vehicle;
slidingly mounting a first portion of a support member, having a rearwardly extending first portion and an upwardly extending second portion and having a cross-sectional shape identical to the opening in the receiving member, in the receiving member;
slidingly mounting a tubular slide member, having a cross-sectional opening of identical shape to the cross-section of the support member, on the second upwardly extending portion of the support member;
mounting a vice on one end of the tubular slide member;
adjusting the relative height of the slide member on the support member to a selected height and lockingly holding the slide member on the receiving member at that position;
adjusting the relative longitudinal position of the support member with respect to the receiving member to a selected longitudinal position and lockingly holding the support member at that position; and
clampingly engaging a work piece in the vice.

12. The method of claim 11 wherein the tailgate assembly comprises a horizontally foldable tailgate assembly and wherein the step of adjusting the relative height of the slide member comprises adjusting the height of the slide member to a height whereat the vice mounted thereon is positioned at approximately the same height as an upper surface of the pickup tailgate assembly in a horizontally folded state thereof and wherein the step of adjusting the relative longitudinal position of the support member with respect to the receiving member comprise adjusting the longitudinal position of the slide member to a position whereat the vice mounted thereon is positioned in adjacent relationship with the tailgate assembly in a horizontally folded state thereof and whereat the receiving member and the support member and the tubular slide member are positioned below the elevation of the tailgate assembly in said horizontally folded state thereof and in noninterfering relationship therewith whereby the tailgate provides an unobstructed horizontal work surface adjacent the vice.

13. An adjustable and removable vice assembly for use on a truck of the type having a rear cargo carrying box and a rearwardly opening tailgate assembly associated with the cargo carrying box comprising:

elongated receiving means fixedly mounted on a rear end portion of the pickup truck proximate and below the tailgate assembly in generally parallel alignment with a longitudinal axis of the pickup truck for slidingly receiving and holding an elongated support member means means therein;

elongated support member means receivable in said receiving means in rearwardly extending relationship therewith for supporting a slide member means thereon said elongated support member means being longitudinally slidingly adjustable with respect to said elongated receiving means and having a first longitudinally extending portion and a second inclined portion extending upwardly from said first portion;

slide member means for supporting a vice means thereon, said slide member means being vertically slidingly adjustable on said elongated support member means and extending upwardly therefrom;

vice means for selectively gripping and holding a work piece mounted on said slide member means in fixed relationship therewith;

stabilizing and holding means operatively associated with said elongated receiving means, said elongated support means and said slide member means for selectively stably holding said receiving means, said support means and said slide member means in a plurality of selected fixed relationships;

whereby said adjustable and removable vice assembly is operably positionable in fixed relationship with a rear end portion of the truck with the tailgate thereof in either a closed state or an open state and whereby said vice assembly is operably positionable in noninterfering relationship with the cargo carrying area of the truck.

14. The invention of claim 13 wherein said elongated receiving means, said elongated support member means and said slide means each comprise square tubing.

15. The invention of claim 14 wherein said elongated support member means second portion extends upwardly and rearwardly from said first portion.

16. The invention of claim 15 wherein said first portion is oriented at approximately 45 degrees with respect to said second portion.

17. The invention of claim 14 wherein said first portion of said elongated support member means is received in close sliding relationship within said elongated receiving means and said second portion of said elongated support member is received in close sliding relationship within said slide member means.

18. The invention of claim 17 wherein said stabilizing and holding means comprise:

a plurality of holes in said first portion of said elongated support member means alignable with at least one hole in said elongated receiving means; and pin means insertable through said alignable holes in said receiving means and said support member means for preventing relative longitudinal movement between said first portion of said support member means and said receiving means.

19. The invention of claim 18 wherein said stabilizing means comprises:

threaded screw receiving means fixedly associated with of said elongated receiving means extending transversely of said elongated receiving means; and screw means threadingly receivable by said screw receiving means and abuttingly engageable with a sidewall portion of said first portion of said elongated support member means for urging said support member means into tight frictional engagement with said elongated receiving means for preventing relative transverse movement of said elongated support member means with respect to said elongated receiving member means.

20. The invention of claim 17 wherein said stabilizing and holding means comprises:

a plurality of vertically extending holes in said first portion of said elongated support means alignable with at least one vertically extending hole in said elongated receiving means;

first pin means insertable through said alignable vertically extending holes in said receiving means and said support member means for restraining lateral and longitudinal movement therebetween;

a plurality of horizontally extending holes in said first portion of said elongated support means alignable with at least one horizontally extending hole in said elongated receiving means; and second pin means insertable through said alignable horizontally extending holes in said receiving means and said support member means for restraining vertical and longitudinal movement therebetween.

* * * * *